United States Patent
Iniewski et al.

(10) Patent No.: US 12,360,060 B2
(45) Date of Patent: Jul. 15, 2025

(54) SYSTEMS AND METHODS FOR K-EDGE-BASED X-RAY IMAGING HAVING IMPROVED CONTRAST-TO-NOISE RATIO

(71) Applicant: REDLEN TECHNOLOGIES, INC., Saanichton (CA)

(72) Inventors: Krzysztof Iniewski, Port Moody (CA); Olivier Tousignant, Brentwood Bay (CA); Elmaddin Guliyev, Vancouver (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 245 days.

(21) Appl. No.: 18/331,490

(22) Filed: Jun. 8, 2023

(65) Prior Publication Data
US 2023/0400422 A1    Dec. 14, 2023

Related U.S. Application Data

(60) Provisional application No. 63/366,342, filed on Jun. 14, 2022.

(51) Int. Cl.
| | |
|---|---|
| *G01N 23/046* | (2018.01) |
| *G01N 23/083* | (2018.01) |
| *G01N 23/223* | (2006.01) |

(52) U.S. Cl.
CPC ......... *G01N 23/046* (2013.01); *G01N 23/083* (2013.01); *G01N 23/223* (2013.01); *G01N 2223/304* (2013.01); *G01N 2223/306* (2013.01)

(58) Field of Classification Search
CPC .. G01N 23/083; G01N 23/046; G01N 23/223; G01N 2223/304; G01N 2223/306; G01N 23/20091; G01N 23/20008; G01N 23/207; G01N 2223/501; G01N 2223/056; G01N 2223/639; G01N 2223/303;
(Continued)

(56) References Cited

U.S. PATENT DOCUMENTS

| | | | |
|---|---|---|---|
| 10,398,394 B2* | 9/2019 | Jin | A61B 6/5217 |
| 10,905,388 B2* | 2/2021 | Kojima | A61B 6/4241 |

(Continued)

OTHER PUBLICATIONS

Bindley, G. et al., "Systems and Methods for Measuring Bone Mass Density Using Energy Discriminating Photon-Counting X-Ray Detector," U.S. Appl. No. 18/177,460, filed Mar. 2, 2023.
(Continued)

*Primary Examiner* — Irakli Kiknadze
(74) *Attorney, Agent, or Firm* — THE MARBURY LAW GROUP PLLC

(57) ABSTRACT

A method of X-ray imaging includes determining energies of photons emitted by an X-ray source and attenuated by an object that are detected by an energy-discriminating radiation detector, generating photon count data by counting a number of detected photons in a plurality of energy bins of the energy-discriminating radiation detector that includes a first energy bin and an adjacent second energy bin, and generating an X-ray image of the object using the photon count data. Detected photons determined to have an energy within a gap region between a maximum energy threshold of the first energy bin and a minimum energy threshold of the second energy bin are not included in the photon count data used to generate the X-ray image of the object.

20 Claims, 9 Drawing Sheets

(58) Field of Classification Search
CPC ........ G01V 5/222; G01V 5/0016; G01V 5/22; A61B 6/4241; A61B 6/4266; A61B 6/463; A61B 6/482; A61B 6/032; A61B 6/025; A61B 6/5258; A61B 6/4035; A61B 6/037; A61B 6/485; A61B 6/5217; A61B 6/58; A61B 6/4042; A61B 6/481; A61B 6/5205; A61B 6/5282; A61B 6/585; A61B 6/03; A61B 6/405; A61B 6/542; A61B 6/0487; G01T 1/36; G01T 1/2985; G01T 1/1663; G01T 1/24; G01T 1/366; G06T 11/006; G06T 2211/408; G06T 11/005; G16H 50/30
USPC .................................................. 378/4, 19, 62
See application file for complete search history.

(56) References Cited

U.S. PATENT DOCUMENTS

| | | | |
|---|---|---|---|
| 11,169,286 B2 | 11/2021 | Guliyev et al. | |
| 2010/0215230 A1* | 8/2010 | Bornefalk | G01T 1/366 382/128 |
| 2017/0238896 A1* | 8/2017 | Iwai | A61B 6/4035 |
| 2019/0383956 A1 | 12/2019 | Guliyev et al. | |
| 2020/0326290 A1* | 10/2020 | Iniewski | G01N 23/20008 |
| 2022/0276184 A1 | 9/2022 | Marthandam et al. | |

OTHER PUBLICATIONS

Dunning, C. et al., "Photon-counting computed tomography of lanthanide contrast agents with a high-flux 330-μm- pitch cadmium zinc Telluride detector in a table-top system," J. Med Imaging (Bellingham). May 2020;7(3):033502. doi: 10.1117/1.JMI.7.3. 033502. Epub Jun. 15, 2020. PMID: 32566695; PMCID: PMC7295177.

Fleiter, T., "Clinical Applications of Spectral Computed Tomography Enabling Technique for Novel Contrast Development and Targeting Imaging," Book title "Spectral, Photon Counting Computed Tomography," 1st Edition, Published 2020, Imprint CRC Press, 14 pages, eBook ISBN 9780429486111.

Kim, J. et al., "Advances in and Uses of Contrast Agents for Spectral Photon Counting Computed Tomography," Book title "Spectral, Photon Counting Computed Tomography," 1st Edition, Published 2020, Imprint CRC Press, 24 pages, eBook ISBN 9780429486111.

Richtsmeier, D. et al., "Multi-contrast K-edge imaging on a bench-top photon-counting CT system: acquisition parameter study," Journal of Instrumentation, vol. 15, Oct. 2020, DOI 10.1088/1748-0221/15/10/P10029.

* cited by examiner

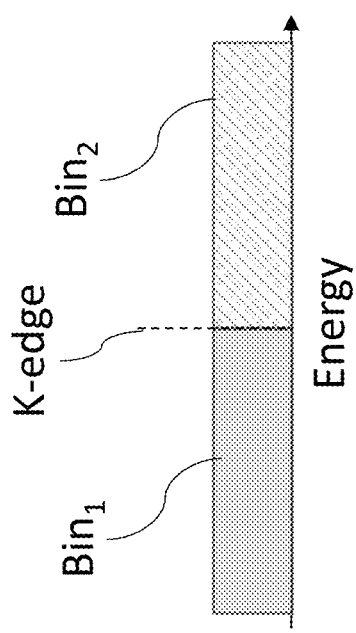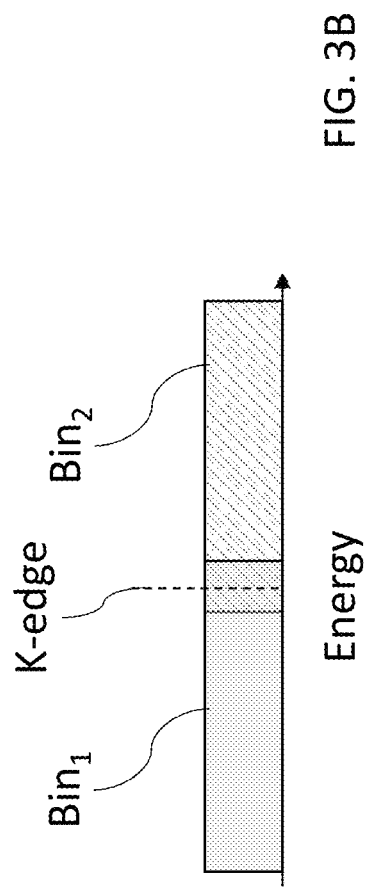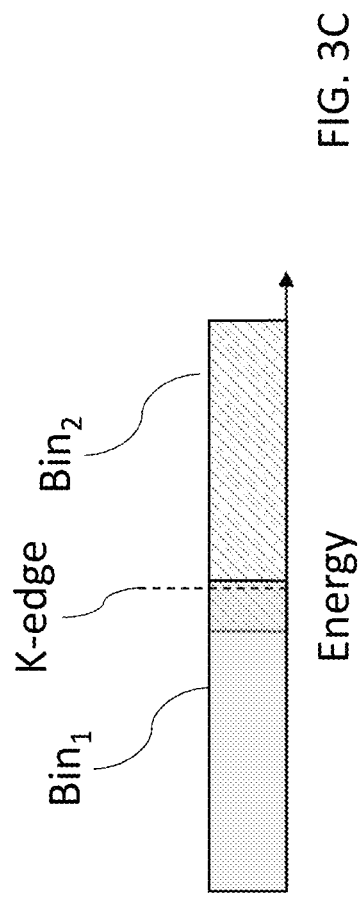

SYSTEMS AND METHODS FOR K-EDGE-BASED X-RAY IMAGING HAVING IMPROVED CONTRAST-TO-NOISE RATIO

FIELD

The present disclosure is directed to the field of X-ray radiation imaging, and specifically to systems and methods for K-edge-based X-ray imaging using an energy-discriminating radiation detector having improved contrast-to-noise ratio (CNR).

BACKGROUND

A number of X-ray imaging applications are known that utilize the so-called "K-edge effect," which is an abrupt change in signal attenuation through a particular material at a known X-ray photon energy. This sudden change in signal attenuation occurs where the X-ray photon energy is just above the binding energy of the electrons of the innermost shell (also known as the K-shell) of the atoms of the material with which the X-ray photons interact. X-ray photons having an energy just above this binding energy (or "K-edge energy") are far more likely to be attenuated due to photoelectric absorption by the atoms of the material than X-ray photons having an energy just below the K-edge energy.

Some X-ray imaging systems utilize the K-edge effect to shape the energy spectrum of the output X-ray beam that is directed at the object being imaged. In some X-ray imaging systems, a K-edge filter located in the output path of the X-ray beam may be used to provide a notch or gap in the energy spectrum of the beam, which may effectively split the beam into low energy and high energy components. This may enable enhanced material discrimination. A number of X-ray scanning systems have been developed that utilize this principle for baggage scanning, bone densitometry measurements (e.g., DEXA scans), and other applications. Some X-ray computed tomography (CT) scanners utilize K-edge filters to cut out portions of the X-ray energy spectrum in order to improve image quality while also reducing overall radiation dose. K-edge filters are typically composed of elements having a relatively high atomic number (i.e., high Z materials) which have K-edge energies within the energy spectrum (e.g., 30 keV-120 keV) of the X-ray output beam in typical X-ray imaging devices.

In X-ray imaging systems utilizing energy-discriminating detectors, such as a photon-counting computed-tomography (PCCT) detector, the detector may be capable of measuring the energies of X-ray photons that impinge on the detector. Thus, the detector may be able to directly detect the X-ray attenuation of the object being scanned on both the low- and high-energy sides of a K-edge threshold. This may be useful, for example, in contrast CT imaging, in which a contrast agent having a known K-edge energy may be introduced to the patient's body (e.g., injected into the patient's bloodstream) during the CT scan. Through proper calibration and configuration of the PCCT detector of the imaging system, the contrast agent may be identifiable in the CT image based on its K-edge energy.

SUMMARY

According to one embodiment of the present disclosure, a method of X-ray imaging includes determining energies of photons emitted by an X-ray source and attenuated by an object that are detected by an energy-discriminating radiation detector, generating photon count data by counting a number of detected photons in a plurality of energy bins of the energy-discriminating radiation detector that includes a first energy bin and an adjacent second energy bin, and generating an X-ray image of the object using the photon count data. Detected photons determined to have an energy within a gap region between a maximum energy threshold of the first energy bin and a minimum energy threshold of the second energy bin are not included in the photon count data used to generate the X-ray image of the object.

According to another embodiment of the present disclosure, an X-ray imaging system includes an X-ray source configured to direct a beam of X-ray radiation at an object, an energy-discriminating radiation detector including a plurality of radiation sensors configured to detect X-rays from the X-ray source that have been attenuated by the object, and detector read-out circuitry configured to determine an energy of X-ray photons detected by the plurality of radiation sensors and to generate photon count data by counting a number of detected photons in a plurality of energy bins, the plurality of energy bins including a first energy bin having a maximum energy threshold that is less than a K-edge energy of a material of interest, and a second energy bin having a minimum energy threshold that is greater than the K-edge energy of the material of interest, and a processor configured to generate an X-ray image of the object using the photon count data, where photons detected by the plurality of radiation sensors that are determined to have an energy within a gap region between the maximum energy threshold of the first energy bin and the minimum energy threshold of the second energy bin are not included in the photon count data used to generate the X-ray image of the object.

BRIEF DESCRIPTION OF THE DRAWINGS

FIG. 3A schematically illustrates a continuous pair of energy bins of an energy-discriminating radiation detector surrounding the K-edge energy of a material of interest.

FIG. 3B schematically illustrates a partial overlap of the pair of energy bins of the energy-discriminating radiation detector of FIG. 3A due to non-zero energy resolution (ER).

FIG. 3C schematically illustrates the threshold drift effect on the pair of energy bins of the energy-discriminating radiation detector of FIG. 3A.

DETAILED DESCRIPTION

Figure 1A:
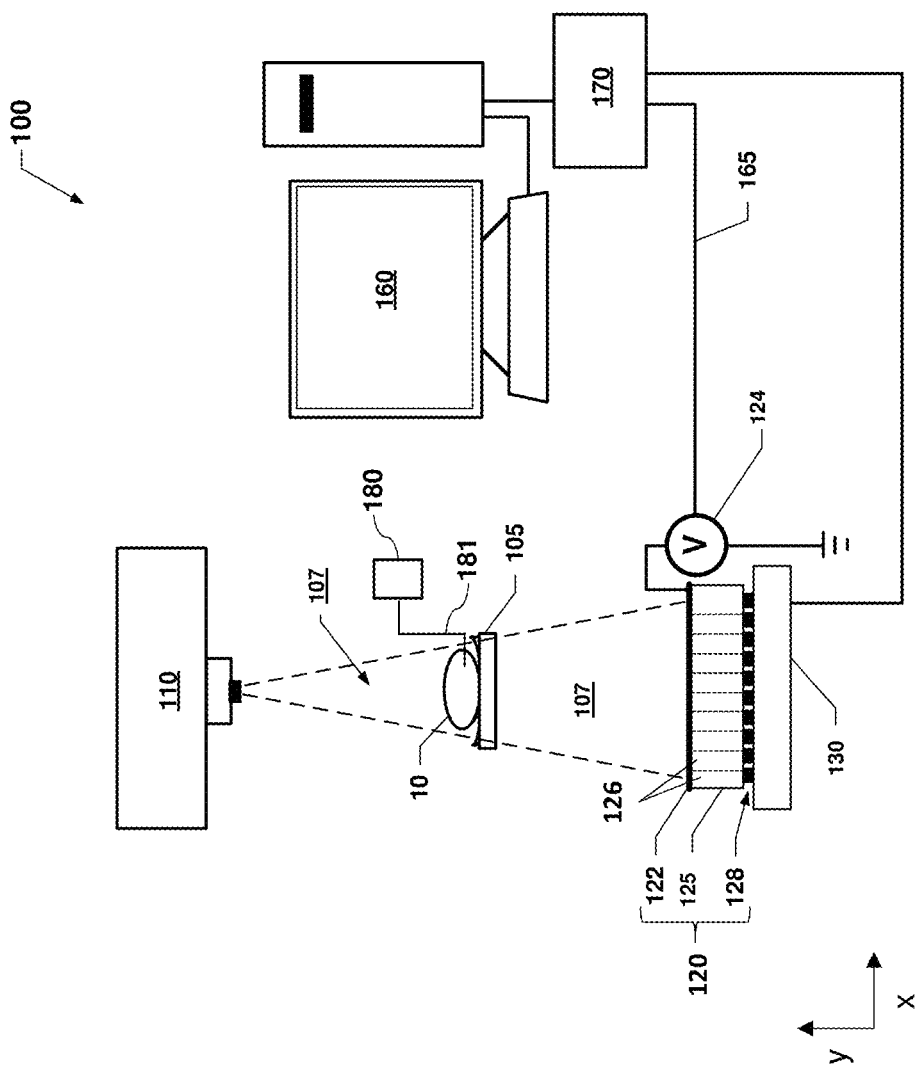
FIG. 1A is a functional block diagram of an exemplary X-ray imaging system in accordance with various embodiments.

As discussed above, the embodiments of the present disclosure are directed to systems and methods for K-edge-based X-ray imaging using an energy-discriminating radiation detector having improved contrast-to-noise ratio (CNR). Specifically, systems and methods for X-ray imaging use an energy-discriminating radiation detector that includes non-continuous energy bins around the K-edge energy of a material of interest. A first energy bin on the lower-energy side of the K-edge energy may have an upper boundary (i.e., maximum energy threshold) at an energy that is less than the K-edge energy. An adjacent second energy bin on the higher-energy side of the K-edge energy may have a lower boundary (i.e., minimum energy threshold) at an energy that is greater than the K-edge energy. As used herein, an adjacent second energy bin is adjacent to the first energy bin along the energy spectrum such that no other energy bins which are used to form the X-ray image are located between the first and the second energy bins. Instead a gap energy bin may be located between the first and second energy bins, such that photons from the gap energy bin are not used to form the X-ray image. In one embodiment, the first and second energy bins are located below and above the K-edge energy of the material of interest, and the K-edge energy falls into the gap energy bin, Photons having energies in the "gap" region (i.e., in the gap bin) between the first and second energy bins may be ignored as they are likely to contain a large proportion of "spillover" photon counts between the first and second energy bins. By reducing the number of "spillover" counts around the K-edge energy, material discrimination and contrast-to-noise ratio may be improved.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

As used herein, a configuration in which a first element that is formed or located "over" a second element is a configuration in which the first element and the second element are in a generally facing configuration, and may, or may not, have a direct contact (physical contact) between the first and second elements. A configuration in which a first element that is formed or located "on" a second element is a configuration in which the first element and the second element are attached to each other directly or through at least one intermediate element. A configuration in which a first element that is formed or located "directly on" a second element is a configuration in which the first element and the second element are in physical contact with each other. Ordinals such as "first" and "second" are employed merely to distinguish similar elements, and different ordinals may be employed to refer to same elements across the specification and the claims. A "top" side and a "bottom" side refer to relative orientations when a structure is viewed in a certain manner, and orientations of a structure and labeling of respective portions change upon rotation of the structure.

FIG. 1A is a functional block diagram of an X-ray imaging system 100 in accordance with various embodiments. The X-ray imaging system 100 may include an X-ray source 110 (i.e., a source of ionizing radiation), and an energy discriminating photon counting radiation detector 120. The X-ray imaging system 100 may additionally include a patient support structure 105, such as a table or frame, which may rest on the floor and may support an object 10 to be scanned. In some embodiments, the object 10 may be a biologic subject (i.e., a human or animal patient). The support structure 105 may be stationary (i.e., non-moving) or may be configured to move relative to other elements of the X-ray imaging system 100, such as the X-ray source.

The X-ray source 110 is typically mounted to a gantry and may move or remain stationary relative to the object 10. The X-ray source 110 is configured to deliver ionizing radiation to the radiation detector 120 by emitting an X-ray beam 107 toward the object 10 and the radiation detector 120. After the X-ray beam 107 is attenuated by the object 10, the beam of radiation 107 is received by the radiation detector 120.

The radiation detector 120 may be controlled by a high voltage bias power supply 124 that selectively creates an electric field between an anode 128 and cathode 122 pair coupled thereto. In one embodiment, the radiation detector 120 includes a plurality of anodes 128 (e.g., one anode per pixel) and one common cathode 122 electrically connected to the power supply 124 and facing the X-ray source 110. The radiation detector 120 may include a detector material 125, such as a semiconductor material disposed between the anode 128 and cathode 122 and thus configured to be exposed to the electrical field therebetween. The semiconductor material may comprise any suitable semiconductor material for detecting X-ray radiation disposed between the anode 128 and cathode 122 and thus configured to be exposed to the electrical field therebetween. In various embodiments, the semiconductor material of the radiation detector 120 may comprise a II-VI semiconductor material, such as cadmium telluride, cadmium zinc telluride (i.e., CdZnTe or "CZT"), cadmium selenide telluride, and cadmium zinc selenide telluride. Other suitable semiconductor materials are within the contemplated scope of disclosure.

A read-out application specific integrated circuit (ASIC) 130 coupled to the anode(s) 122 may receive signals (e.g., charge or current) from the anode 128(s) and be configured to provide data to and by controlled by a control unit 170. The radiation detector 120 may be segmented or configured into a large number of small "pixel" detectors 126. In various embodiments, the pixel detectors 126 of the radiation detector 120 and the ASIC 130 are configured to output data that includes counts of photons detected in each pixel detector in each of a number of energy bins. Thus, radiation detectors 120 of various embodiments provide both two-dimensional detection information regarding where photons were detected, thereby providing image information, and measurements of the energy of the detected X-ray photons. A radiation detector 120 that is capable of measuring the energy of the X-ray photons impinging on the detector 120 may be referred to as an energy-discriminating radiation detector 120.

The control unit 170 may be configured to synchronize the X-ray source 110, the read-out ASIC 130, and the high voltage bias power supply 124. The control unit 170 may be coupled to and operated from a computing device 160. Alternatively, the computing device 160 and the control unit 170 may be integrated together as one device.

In some embodiments, the X-ray imaging system 100 may be a computed tomography (CT) imaging system. The CT imaging system 100 may include a gantry (not shown in FIG. 1A), which may include a moving part, such as a circular, rotating frame with the X-ray source 110 mounted on one side and the radiation detector 120 mounted on the other side. The radiation detector 120 may have a curved shape along its long axis (i.e., the x-axis direction in FIG. 1A) such that each of the pixel detectors along the length of the radiation detector may face towards the focal spot of the X-ray source 110. The gantry may also include a stationary (i.e., non-moving) part, such as a support, legs, mounting frame, etc., which rests on the floor and supports the moving part. The X-ray source 110 may emit a fan-shaped or cone-shaped X-ray beam 107 as the X-ray source 110 and the radiation detector 120 rotate on the moving part of the gantry around the object 10 to be scanned. After the X-ray beam 107 is attenuated by the object 10, the X-ray beam 107 is received by the radiation detector 120. The curved shape of the radiation detector 120 may allow the CT imaging system 100 to create a 360° continuous circular ring of the image of the object 10 by rotating the moving part of the gantry around the object 10.

For each complete rotation of the X-ray source 110 and the radiation detector 120 around the object 10, one cross-sectional slice of the object 10 may be acquired. As the X-ray source 110 and the radiation detector 120 continue to rotate, the radiation detector 120 may take numerous snapshots called "views". Typically, about 1,000 profiles are taken in one rotation of the X-ray source 110 and the radiation detector 120. The X-ray source 110 and the detector 120 may slowly move relative to the patient along a horizontal direction (i.e., into and out of the page in FIG. 1A) so that the detector 120 may capture incremental cross-sectional profiles over a region of interest (ROI) of the object 10, which may include the entire object 10. The data acquired by the radiation detector 120 and output by the read-out ASIC 130 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure (e.g., gantry) supporting the radiation detector 120 and a stationary support part of the support structure, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form a three-dimensional computed tomographic (CT) reconstruction of the object 10 and/or two-dimensional images of cross-sectional slices of the object 10.

Various alternatives to the design of the X-ray imaging system 100 of FIG. 1A may be employed to practice embodiments of the present disclosure. X-ray imaging systems may be designed in various architectures and configurations. For example, an X-ray imaging system may have a helical architecture. In a helical X-ray imaging scanner, the X-ray source 110 and radiation detector 120 are attached to a freely rotating gantry. During a scan, a table moves the object 10 smoothly through the scanner, or alternatively, the X-ray source 110 and detector 120 may move along the length of the object 10, creating helical path traced out by the X-ray beam. Slip rings may be used to transfer power and/or data on and off the rotating gantry. In other embodiments, the X-ray imaging system may be a tomosynthesis X-ray imaging system. In a tomosynthesis X-ray scanner, the gantry may move in a limited rotation angle (e.g., between 15 degrees and 60 degrees) in order to detect a cross-sectional slice of the object 10. The tomosynthesis X-ray scanner may be able to acquire slices at different depths and with different thicknesses that may be reconstructed via image processing.

Figure 1B:
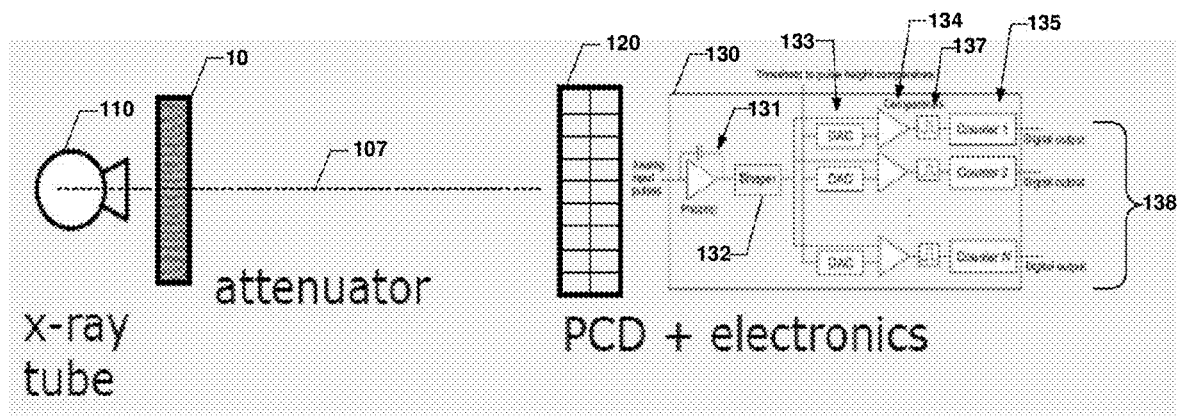
FIG. 1B is a block diagram illustrating components of an X-ray imaging system in accordance with various embodiments.

FIG. 1B illustrates components of an X-ray imaging system, including components within the ASIC 130 configured to count X-ray photons detected in each pixel detector within a set of energy bins. As used herein, the terms "energy bin" and "bin" refer to a particular range of measured photon energies between a minimum energy threshold and a maximum energy threshold. For example, a first bin may refer to counts of photons determined to have an energy greater than a threshold energy (referred to as a trigger threshold, e.g., 20 keV) and less than 40 keV, while a second bin may refer to counts of photons determined to have an energy greater than 40 keV and less than 60 keV, and so forth.

X-rays 107 from an X-ray source (e.g., X-ray tube) 110 may be attenuated by a target (e.g., an object 10, such as a human or animal patient) before interacting with the radiation detector material within the pixelated detector array 120. An X-ray photon interacting (e.g., via the photoelectric effect) with a pixelated radiation detector material generates an electron cloud within the material that is swept by an electric field to the anode electrode 122. The charge gathered on the anode creates a signal that is integrated by a charge sensitive amplifier (CSA) 131. There may be a CSA 131 for each pixel detector (e.g., for each anode 128) within the pixelated X-ray detector 120. The voltage of the CSA output signal may be proportional to the energy of the X-ray photon. The output signal of the CSA may be processed by an analog filter or shaper 132.

The filtered output may be connected to the inputs of a number of analog comparators 134, with each comparator connected to a digital-to-analog converter (DAC) 133 that inputs to the comparator a DAC output voltage that corresponds to the threshold level defining the limits of an energy bin. The detector circuitry 130 may be configured so that after the CSA voltage has stabilized (after the dead time), that voltage may be between two voltage thresholds set by two DACs 133, which determines the output of the comparators 134. Outputs from the comparators 134 may be processed through decision gates 137, with a positive output from a comparator 134 corresponding to a particular energy bin (defined by the DAC output voltages) resulting in a count added to an associated counter 135 for the particular energy bin. Periodically, the counts in each energy bin counter 135 are output as signals 138 to the control unit 170.

The detector array of an X-ray imaging system may include an array of radiation detector elements, referred to herein as pixel detectors. The signals from the pixel detectors may be processed by a pixel detector circuit, which may sort detected photons into energy bins based on the energy of each photon or the voltage generated by the received photon. When an X-ray photon is detected, its energy is determined and the X-ray photon count for its associated energy bin is incremented. For example, if the detected energy of an X-ray photon is 24 kilo-electron-volts (keV), the X-ray photon count for the energy bin of 20-40 keV may be incremented. The number of energy bins may be three or more, such as four to twelve. In an illustrative example, an X-ray photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 90 keV, and a fourth bin for detecting photons having an energy above 90 keV (e.g., between 90 keV and 120 keV). The greater the total number of energy bins, the better the material discrimination. The total number of energy bins and the energy range of each bin may be selectable by a user, such as by adjusting the threshold levels defining the limits of the respective energy bins in the read-out ASIC 130 as shown in FIG. 1B.

In some embodiments, the X-ray imaging scan may be performed in conjunction with the introduction of a contrast medium into the object 10 (e.g., a human or animal patient) that is being scanned. FIG. 1A schematically illustrates a source 180 of a contrast medium (which may also be referred to as a contrast agent) and a conduit 181 that extends from the source 180 of the contrast medium into the object 10. In some embodiments, the conduit 181 may be a fluid conduit, such as an intravenous (IV) line, that may be configured to introduce the contrast medium into the bloodstream of a human or animal patient 10. The source 180 of the contrast medium may be a contrast injection apparatus that may provide a controlled volume (e.g., a bolus) of a solution containing the contrast medium through the conduit 181 and into the patient's bloodstream. Suitable contrast media may include, without limitation, an iodine-containing composition (e.g., diatrizoate meglumine, diatrizoate sodium, iodipamide meglumine, iodixanol, iohexol, iopamidol, iopromide, iothalamate meglumine, ioversol, ioxaglate meglumine, ioxaglate sodium, ioxilan, etc.), a gold-containing composition (e.g., gold nanoparticles), a gadolinium-containing composition, an ytterbium-containing composition (e.g., ytterbium nano-colloids), a lanthanum-containing composition, a lutetium-containing composition, a barium-containing composition, and/or a holmium-containing composition. Other suitable contrast media are within the contemplated scope of disclosure. The contrast injection apparatus may be configured to administer the contrast medium to the body of the patient in coordination with an imaging scan of the patient using the X-ray imaging system 100. Alternatively, the contrast agent may be administered to the patient orally or intravenously prior to the patient entering the system 100. Thus, the source 180 and the conduit 181 may be located in a separate location (e.g., in another room) from the system 100 in an alternative embodiment. In another alternative embodiment, the source 180 may comprise a drinking container (e.g., a cup) and the conduit 181 may be omitted if the contrast agent is administered orally.

Figure 2:
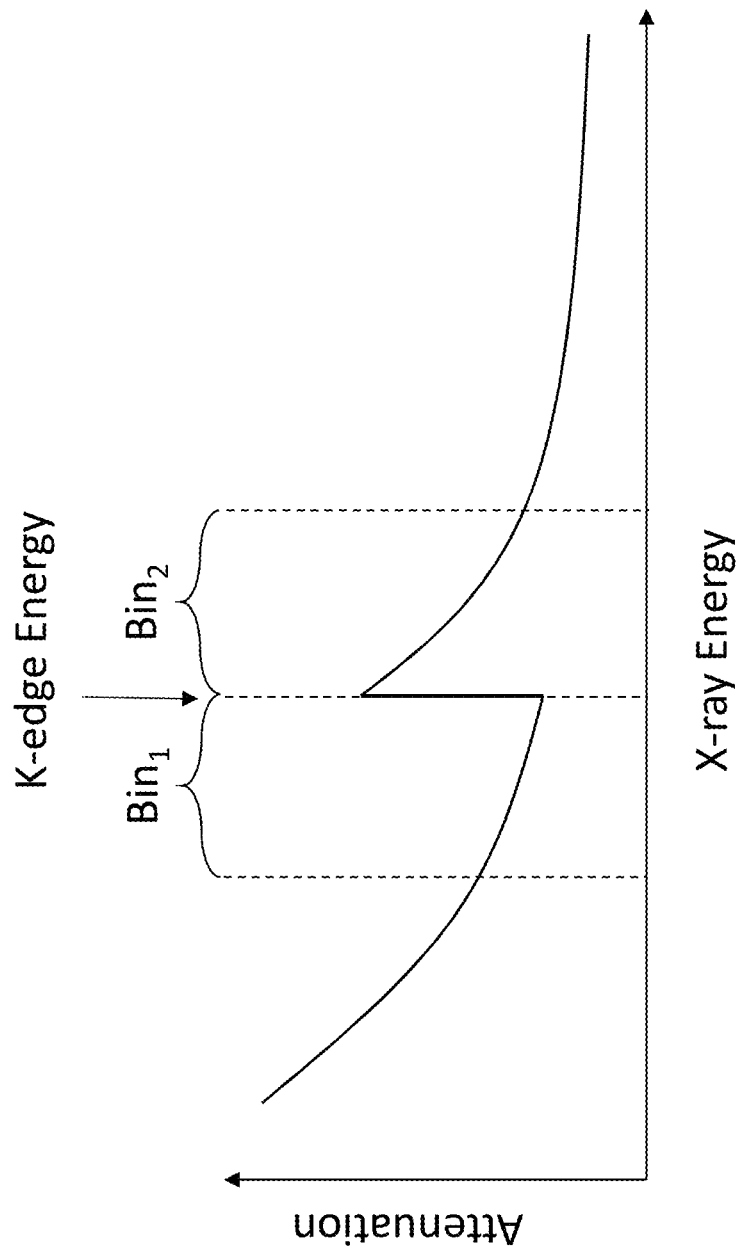
FIG. 2 is a plot of X-ray absorption coefficient of a material of interest as a function of X-ray photon energy schematically illustrating the K-edge absorption effect.

In various embodiments, an X-ray imaging system 100 including an energy discriminating radiation detector 120 as shown in FIGS. 1A and 1B may be used for spectral K-edge imaging. As discussed above, the K-absorption edge (or "K-edge") refers to the sudden increase in photoelectric absorption of X-ray photons having an energy that is just above the binding energy of the k-shell electrons of the absorbing atoms. FIG. 2 is a plot of the X-ray absorption coefficient of a material of interest as a function of X-ray energy spectrum. As shown in FIG. 2, there is an abrupt increase in the X-ray absorption coefficient of the material at X-ray photon energies just above the K-edge energy. When using an energy discriminating radiation detector 120 as described above, the energy threshold between two adjacent energy bins of the detector 120, $Bin_1$ and $Bin_2$, may be set to correspond to the K-edge energy of the material of interest, as schematically illustrated in FIG. 2. Differences in the detected X-ray attenuation (i.e., photon counts) between $Bin_1$ (i.e., photon counts of X-rays having energies just below the K-edge energy level) and $Bin_2$ (i.e., photon counts of X-rays having energies just above the K-edge energy level) may be used to distinguish the material of interest from the surrounding material(s) in the obtained X-ray images (e.g., using a suitable material discrimination algorithm). In some embodiments, the material of interest may be a contrast agent having a known K-edge energy that is introduced into the body of a human or animal patient. This may enable features of the body containing the contrast agent, including soft-tissue or other biological features, to be readily identified in the obtained X-ray images.

Contrast to noise (CNR) is an important parameter in many X-ray imaging applications, such as medical X-ray imaging applications. The CNR is often expressed as the difference between the average radiodensity values (which may be expressed as Hounsfield units (HU)) in the pixels (or voxels) corresponding to a region-of-interest in the X-ray image and the average radiodensity values in the pixels (or voxels) in a background region of the X-ray image, divided by the noise in the X-ray image. In X-ray contrast imaging, a higher CNR may enable the contrast dose that is administered to the patient to be decreased while still providing adequate material discrimination. Lower doses of contrast agent are desirable due to the high costs of many contrast agents, as well as the health risks associated with some contrast agents. A number of factors can affect the CNR of the X-ray images, including the particular contrast agent used (and its associated K-edge energy), the tube voltage of the X-ray source, the particular detector technology utilized, and the energy threshold settings (i.e., energy bin settings) of the energy-discriminating radiation detector.

The energy bins of an energy-discriminating radiation detector are typically configured to be continuous over the X-ray energy spectrum. This is optimal from a statistics point-of-view since the total photon counts may be maximized and noise may be decreased. However, this may not be optimal from the perspective of CNR. FIG. 3A schematically illustrates a pair of energy bins, $Bin_1$ and $Bin_2$, of a photon-counting energy-discriminating detector in an ideal case in which the energy resolution (ER) of the detector is zero. As shown in FIG. 3A, the energy bins $Bin_1$ and $Bin_2$ are continuous over a portion of the X-ray energy spectrum, where the boundary (i.e., energy threshold) between $Bin_1$ and $Bin_2$ is set to coincide with the K-edge energy of a material of interest. However, for a real-world detector, the energy resolution (ER) of the detector is non-zero, and may be on the order of several keV, such as between about 4 keV and about 8 keV. This means that the adjacent energy bins $Bin_1$ and $Bin_2$ may effectively overlap with each other near the boundary between the bins. This is schematically illustrated in FIG. 3B, which shows $Bin_1$ partially overlapping with $Bin_2$. Accordingly, photons having energies near the boundary between $Bin_1$ and $Bin_2$ may be counted in either energy bin. By way of example, if the energy thresholds are set such that $Bin_1$ extends between 20 keV and 40 keV, and $Bin_2$ extends between 40 keV and 60 keV, the non-zero ER of the detector will result in some X-ray photons having energies of 41 keV being counted in $Bin_2$, while other X-ray photons having the same 41 keV energy will be counted in $Bin_1$. This issue may be further compounded by a phenomenon known as "threshold drift," in which the boundary between adjacent energy bins may undesirably shift by several keV (e.g., by 2-4 keV) under certain circumstances, such as changes in X-ray flux and/or temperature. This is schematically illustrated in FIG. 3C, which shows the boundary between $Bin_1$ and $Bin_2$ shifted to a different energy with respect to the K-edge energy of the material of interest. The result of such as shift is that an even greater portion of X-ray photons having energies above the K-edge energy which should be counted in one bin will instead be sorted into the adjacent bin.

The non-zero energy resolution (ER) of an energy discriminating radiation detector, in addition to the "threshold drift" effect described above, results in a "spillover" of photon counts between adjacent energy bins, in which a portion of the detected photons having energies above the energy threshold between adjacent bins may be sorted into the lower-energy bin, and a portion of the detected photons having energies below the energy threshold between the adjacent bins may be sorted into the higher-energy bin. This may also be referred to as "energy crosstalk" between adjacent energy bins along the X-ray energy spectrum. This "spillover" of photon counts may have a negative effect on the performance of the algorithms used for material discrimination, and may also reduce the CNR of the X-ray images.

Various embodiments include systems and methods for X-ray imaging using an energy-discriminating radiation detector that include non-continuous energy bins around the K-edge energy of a material of interest (e.g., the contrast agent). In particular, a first energy bin on the lower-energy side of the K-edge energy may have an upper boundary (i.e., maximum energy threshold) at an energy that is less than the K-edge energy, and a second energy bin on the higher-energy side of the K-edge energy may have a lower boundary (i.e., minimum energy threshold) at an energy that is greater than the K-edge energy. In some embodiments, the upper boundary of the first energy bin and the lower boundary of the second energy bin may be equally-spaced from the K-edge energy. Photons having energies in the "gap" region between the first and second energy bins may be ignored as they are likely to contain a large proportion of "spillover" counts. The "gap" region between the upper boundary (i.e., maximum energy threshold) of the first energy bin and the lower boundary (i.e., minimum energy threshold) of the second energy bin may be least about 0.5 keV, such as between about 1 keV and about 5 keV, including between about 2 keV and about 4 keV.

In various embodiments, a "gap bin" may be provided between the respective energy bins on the lower-energy and higher-energy sides of the K-edge energy. The gap bin may have a lower boundary (i.e., minimum energy threshold) at an energy that is below the K-edge energy of the material of interest, and an upper boundary (i.e., maximum energy threshold) at an energy that is above the K-edge energy of the material of interest. In some embodiments, the lower boundary and the upper boundary of the gap bin may be equally spaced from the K-edge energy. The width of the gap bin may be at least about 0.5 keV, such as between about 1 keV and about 5 keV, including between about 2 keV and about 4 keV.

The inclusion of a gap bin around the K-edge energy may reduce the "spillover" of photon counts between the adjacent energy bins on the low-energy side and the high-energy side of the gap bin. In various embodiments, because photon counts within the gap bin are likely to include a relatively high proportion of "spillover" counts, the detector circuitry (e.g., ASIC 130 in FIGS. 1A and 1B) may be configured to ignore photon counts recorded within the gap bin. While this may result in an overall loss in photon counts, by reducing the number of "spillover" counts that are recorded in the energy bins below and above the K-edge energy, the CNR of the resultant X-ray images may be improved and material discrimination within the X-ray images may be enhanced. In some embodiments, the improved CNR and material discrimination may enable less contrast agent to be administered during an X-ray scan.

Figure 4:
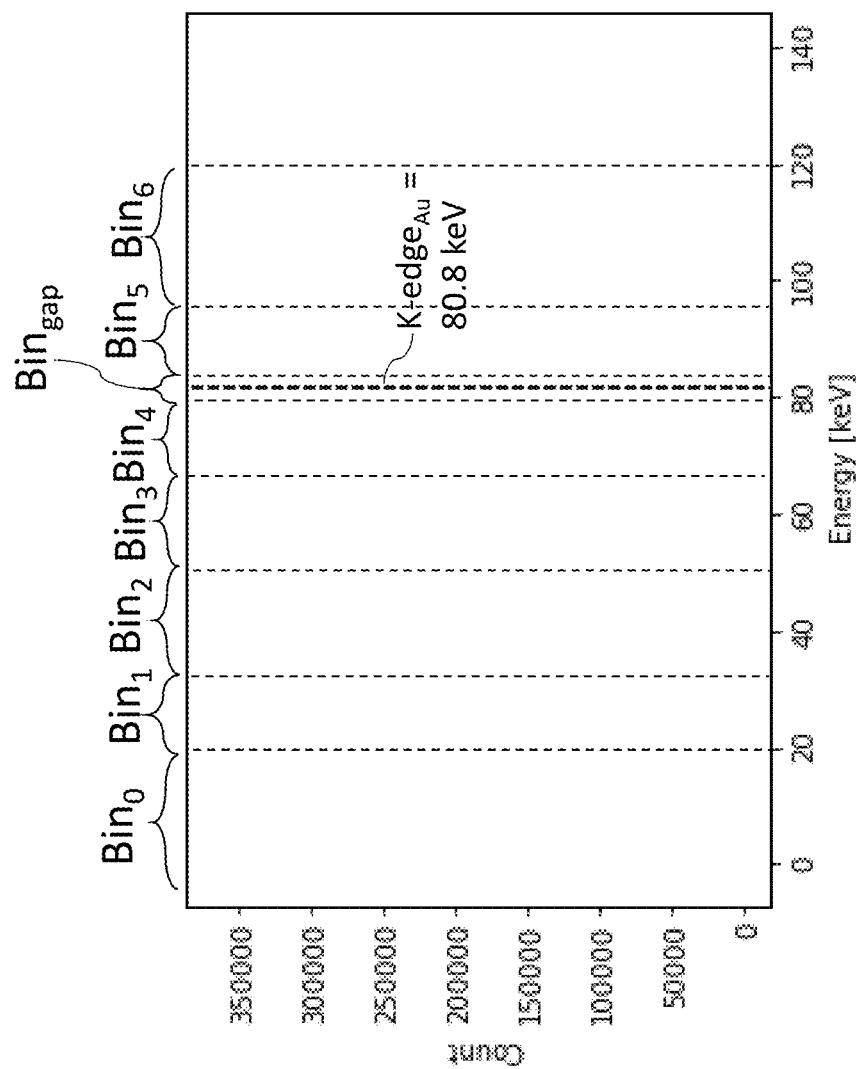
FIG. 4 schematically illustrates a configuration of the energy bins in an energy-discriminating photon-counting radiation detector including a gap bin surrounding the K-edge energy of a material of interest according to an embodiment of the present disclosure.

FIG. 4 schematically illustrates a configuration of the energy bins in an energy-discriminating photon-counting radiation detector according to an embodiment of the present disclosure. In this embodiment, the radiation detector includes seven conventional energy bins ($Bin_0$ through $Bin_6$) and a gap bin ($Bin_{gap}$) located between $Bin_4$ and $Bin_5$. The gap bin, $Bin_{gap}$, covers a small portion of the energy spectrum (e.g., between 2-4 keV in width) around 80.7 keV, which is the K-edge energy of gold. Photon counts recorded in the gap bin, $Bin_{gap}$, may be ignored (e.g., not sent from the detector read-out circuitry to the control unit 170/computing device 160 and/or not used by the computing device 160 in performing image processing applications). The photon counts in $Bin_4$ and in $Bin_5$, which are located on the low-energy and the high-energy sides of the K-edge, respectively, may be relatively less contaminated by "spillover" counts than in the case in which the bins are continuous, which may provide improved material discrimination and higher CNR in the X-ray images. In some embodiments, a configuration of energy bins such as shown in FIG. 4 may be used for X-ray imaging using a gold-containing contrast agent that may be administered to a human or animal patient. The gold-containing contrast agent may include gold nanoparticles, which may optionally include a functionalized biomolecular coating. Alternatively, the configuration of energy bins shown in FIG. 4 may be used with a gold K-edge filter disposed in the output path of the X-ray beam from the X-ray source (e.g., for baggage scanning or industrial applications).

Although FIG. 4 illustrates an embodiment including six conventional energy bins and a "gap" bin, it will be understood that the radiation detector may be configured with more or less energy bins. In general, various embodiments may include at least two energy bins and a gap bin located between two of the energy bins and surrounding the K-edge energy of a material of interest. Photon counts within the gap bin are not used for image processing of the collected X-ray attenuation data. In addition, although the embodiment shown in FIG. 4 illustrates the gap bin surrounding the 80.7 keV K-edge energy of gold, it will be understood that a gap bin may be provided surrounding the K-edge energy of any suitable material, such as iodine (K-edge energy of 33.2 keV), gadolinium (K-edge energy of 50.2 keV), barium (K-edge energy of 37.4 keV), ytterbium (K-edge energy of 61.3 keV), lanthanum (K-edge energy of 38.9 keV), lutetium (K-edge energy of 66.3 keV), holmium (K-edge energy of 55.6 keV), or any other material having a K-edge energy within the energy spectrum of the X-ray beam of the imaging system.

Figure 5:
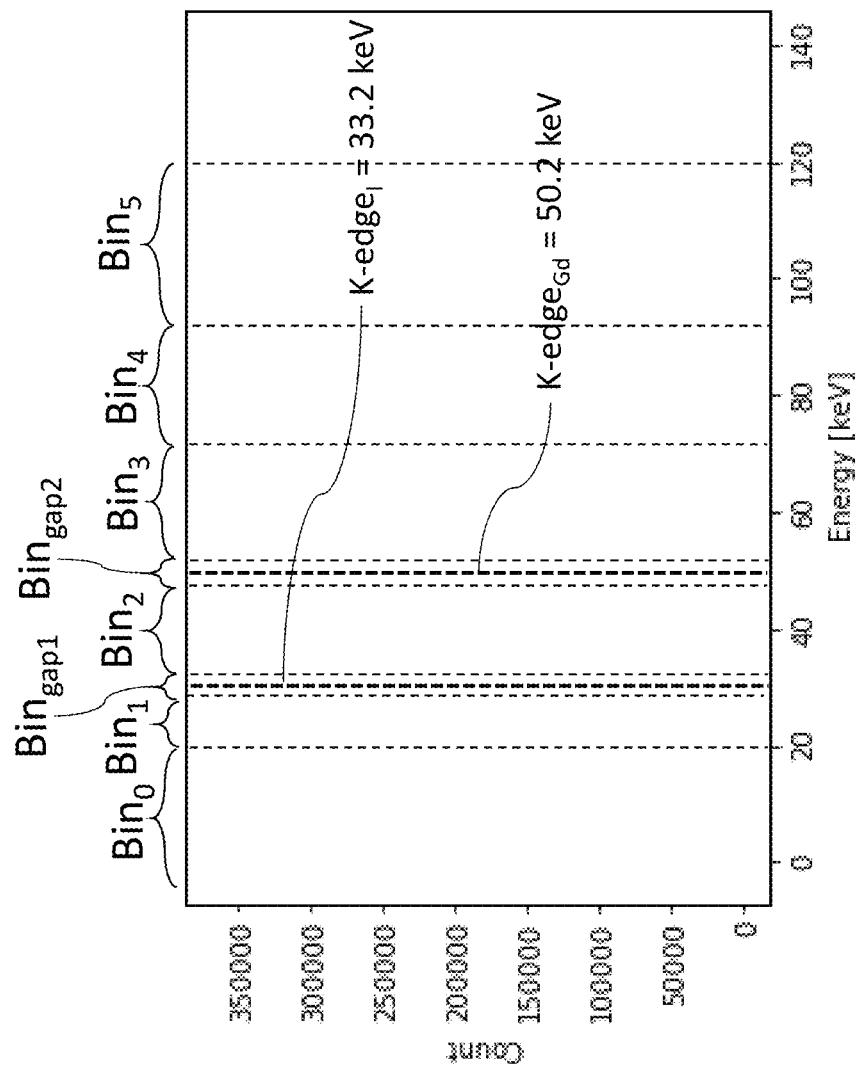
FIG. 5 schematically illustrates a configuration of the energy bins in an energy-discriminating photon-counting radiation detector including a pair of gap bins surrounding the respective K-edge energies of two different materials-of-interest according to an embodiment of the present disclosure.

FIG. 5 schematically illustrates an alternative configuration of the energy bins in an energy-discriminating photon-counting radiation detector that includes two gap bins, $Bin_{gap1}$ and $Bin_{gap2}$ according to an embodiment of the present disclosure. The radiation detector illustrated in FIG. 5 includes six conventional energy bins ($Bin_0$ through $Bin_5$). A first gap bin, $Bin_{gap1}$, is located between $Bin_1$ and $Bin_2$, and surrounds the 33.2 keV K-edge energy of iodine. A second gap bin, $Bin_{gap2}$, is located between $Bin_2$ and $Bin_3$, and surrounds the 50.2 keV K-edge energy of gadolinium. Each of the gap bins $Bin_{gap1}$ and $Bin_{gap2}$ may cover a narrow range (e.g., 2-4 keV) of the energy spectrum surrounding the respective K-edge energies. Gap bin $Bin_{gap1}$ may reduce the "spillover" of photon counts between $Bin_1$ and $Bin_2$ and gap bin $Bin_{gap2}$ may reduce the "spillover" of photon counts between $Bin_2$ and $Bin_3$. This may provide improved material discrimination and higher CNR. In some embodiments, a configuration of energy bins such as shown in FIG. 5 may be used for X-ray imaging using multiple different contrast agents (e.g., an iodine-containing contrast agent and a gadolinium-containing contrast agent). The contrast agents may be administered to a human or animal patient simultaneously or sequentially in coordination with (e.g., before and/or during) one or more X-ray scans being performed on the patient. A computing device 160 (see FIG. 1A) may process the resultant X-ray images to generate a composite image that includes a conventional X-ray (e.g., CT) image with overlay images highlighting the different contrast agents (e.g., iodine and gadolinium in the embodiment of FIG. 5). Although the embodiment of FIG. 5 illustrates a pair of gap regions surrounding the K-edge energies of two contrast agents, it will be understood that various embodiments may include more than two gap regions, where each gap region may surround a unique K-edge energy of a different contrast agent.

Figure 6:
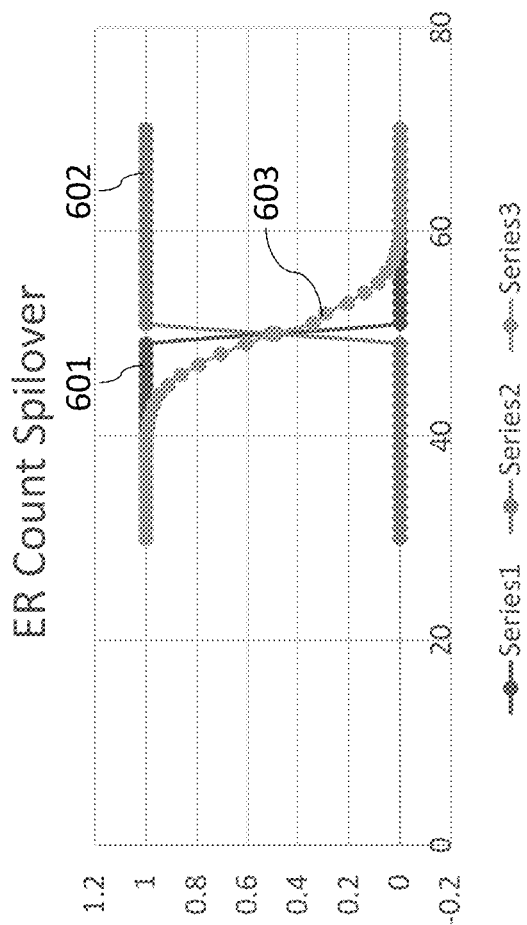
FIG. 6 is a plot illustrating the spillover counts of two adjacent energy bins of an energy-discriminating radiation detector at different simulated energy resolutions (ER).

The improvements in CNR and material discrimination provided by the various embodiments of the disclosure that include non-continuous energy bins surrounding the K-edge energy of a material of interest may be demonstrated using numerical simulations. FIG. 6 is a plot illustrating the spillover counts of energy bins at different simulated energy resolutions (ER). Simulations were run at four different energy resolutions, 0 keV (ideal case, not achievable in practice), 4 keV, 8 keV, and 12 keV (used to illustrate worst case ER). The spillover of counts from $Bin_1$ (curve 601) to $Bin_2$ (curve 602) is calculated based on curve 603.

In the comparative example, the two bins are continuous. The first bin, $Bin_1$ extends between 30 keV and 50 keV, and a second bid, $Bin_2$ extends between 50 keV and 70 keV. The spillover of counts from $Bin_1$ to $Bin_2$ (i.e., photons having energies less than 50 keV but recorded in the 50-70 keV bin) was calculated to be 0% for the ideal case with ideal (i.e., 0 keV) ER, 3.35% in the case of 4 keV ER, 5.85% in the case of 8 keV ER, and 8.4% in the case of 12 keV ER.

In a first embodiment example, the same simulations were run using non-continuous energy bins, with a 1 keV gap on either side of 50 keV. Simulated photon counts from the "gap" region (i.e., 49-51 keV) were discarded. The spillover of counts from $Bin_1$ to $Bin_2$ in this case was calculated to be 0% in the ideal case of 0 keV ER, 0.85% in the case of 4 keV ER, 3.5% in the case of 8 keV ER, and 5.9% in the case of 12 keV ER. Thus, in all cases with non-zero ER, the percentage of spillover counts from $Bin_1$ to $Bin_2$ was significantly reduced when photon counts in the ±1 keV "gap" region around 50 keV were discarded. The reduction in spillover counts was particularly pronounced for lower ERs (e.g., from 3.53% to 0.85% in the case of 4 keV ER).

In a second embodiment example, the simulations were run using non-continuous energy bins with a 2 keV gap on either side of 50 keV. Simulated photon counts from the "gap" region (i.e., 48-52 keV) were discarded. The spillover of counts from $Bin_1$ to $Bin_2$ in this case was calculated to be 0% in the ideal case of 0 keV ER, 0.3% in the case of 4 keV ER, 2.0% in the case of 8 keV ER, and 4.2% in the case of 12 keV ER. Again, the percentage of spillover counts from $Bin_1$ to $Bin_2$ was significantly reduced compared to the baseline case with continuous bins, with particularly pronounced improvement for lower ERs (e.g., from 3.53% to 0.3% in the case of 4 keV ER).

Figure 7:
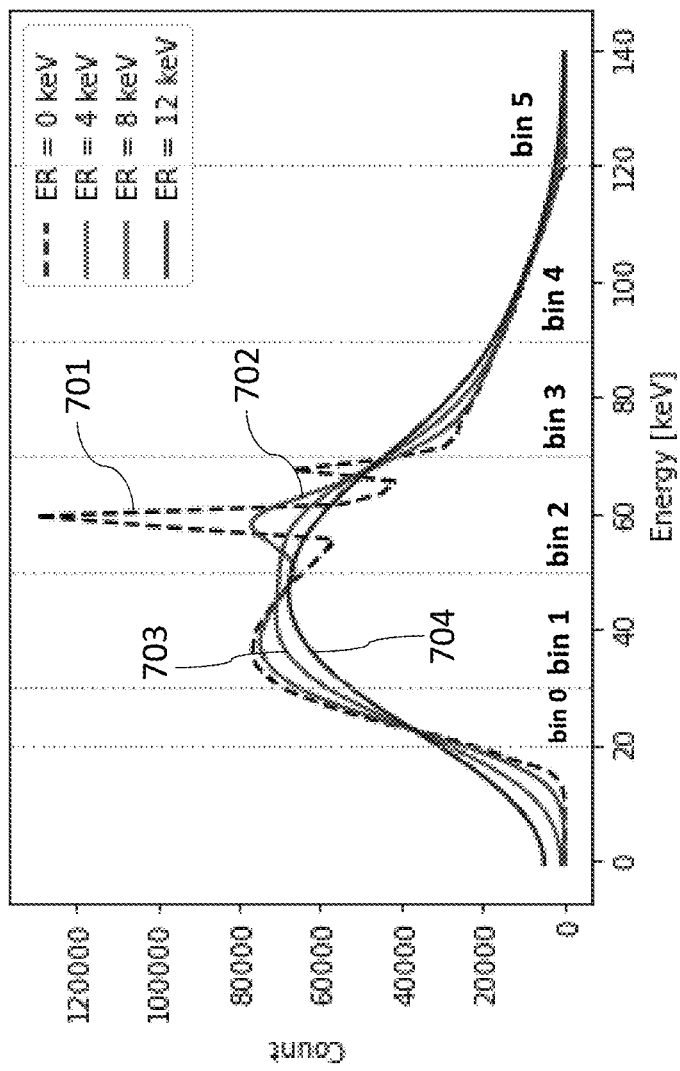
FIG. 7 is a plot illustrating simulated X-ray curves at different energy resolution (ER) values of an energy-discriminating photon-counting X-ray detector.

FIG. 7 is a plot illustrating simulated X-ray curves at different energy resolution (ER) values of an energy-discriminating photon-counting X-ray detector. The detector in these simulations included six continuous energy bins extending from 20-30 keV ($Bin_0$), 30-50 keV ($Bin_1$), 50-70 keV ($Bin_2$), 70-90 keV ($Bin_3$), 90-120 keV ($Bin_4$), and 120+ keV ($Bin_5$). The X-ray curves were simulated at 0 keV ER (curve 701), 4 keV ER (curve 702), 8 keV ER (curve 703), and 12 keV ER (curve 704). The simulations were performed with the assumption of no filter in the X-ray output beam, and a kilovoltage peak (kVpp) of 120 keV.

The spillover of photon counts from $Bin_4$ to $Bin_5$ was calculated for each of the ER values. In theory, there should be no photon counts in $Bin_5$ since it is outside of the energy spectrum of the simulated X-ray beam. This was true for the ideal case of 0 keV ER, as indicated in Table 1 below. However, with increasing ER values (i.e., worse energy resolution), the percentage of the photon count spillover from $Bin_4$ to $Bin_5$ increases, with an 8.4% spillover for the worst case of 12 keV ER. Similarly, with increasing ER values, $Bin_0$ begins to lose counts due as photons drop below the 20 keV lower boundary of $Bin_0$. This effect is illustrated in the "Bin 0 Loss" column in Table 1, which shows that at an ER of 12 keV, 11.4% of the photon counts drop out of the lowest-energy energy bin as compared to the ideal case where ER is 0 keV. The spillover effect on Bins 0 and 4 may actually be more significant than is shown in Table 1, as the table does not include the spillover of counts between Bin 0 and Bin 1, as well as the spillover of counts between Bin 4 and Bin 3.

TABLE 1

| ER (keV) | Bin 5 Spillover | Bin 0 Loss |
| --- | --- | --- |
| 0 | 0% | 0% |
| 4 | 1.2% | 2.9% |
| 8 | 3.9% | 7.6% |
| 12 | 8.4% | 11.4% |

The same simulations were run using non-continuous energy bins, with ±1 keV "gaps" provided at the upper and lower boundaries of each of the energy bins. In particular, "gap bins" were provided at 19-21 keV, 29-31 keV, 49-51 keV, 69-71 keV, 89-91 keV, and 119-121 keV. Photon counts within the "gap bins" were discarded. The spillover of photon counts from $Bin_4$ to $Bin_5$ and the loss of counts from $Bin_0$ were calculated for each of the ER values, as shown in Table 2. As in the case shown in Table 1, $Bin_5$ contains no counts with 0 keV ER, with an increasing percentage of "spillover" counts from $Bin_4$ as the ER increases (i.e., worsens). For the "Bin 0 loss" calculations, the "gap bin" around the lower boundary of $Bin_0$ results in some count loss even in the case of an ideal ER of 0 keV, with moderate increases in the count loss percentage with increasing ER values. In practice, the loss of a small percentage of counts from the lowest energy bin ($Bin_0$) of the detector typically has little practical effect.

TABLE 2

| ER (keV) | Bin 5 Spillover | Bin 0 Loss |
| --- | --- | --- |
| 0 | 0% | 3.21% |
| 4 | 0.85% | 3.28% |
| 8 | 3.45% | 3.44% |
| 12 | 7.83% | 3.70% |

The same simulations were run using non-continuous energy bins, with ±2 keV "gaps" provided at the upper and lower boundaries of each of the energy bins. In particular, "gap bins" were provided at 18-22 keV, 28-32 keV, 48-52 keV, 68-72 keV, 88-91 keV, and 118-122 keV. Photon counts within the "gap bins" were discarded. The spillover of photon counts from $Bin_4$ to $Bin_5$ and the loss of counts from $Bin_0$ were calculated for each of the ER values, as shown in Table 3. As in the case shown in Tables 1 and 2, $Bin_5$ contains no counts with 0 keV ER, with an increasing percentage of "spillover" counts from $Bin_4$ as the ER increases (i.e., worsens). For the "Bin 0 loss" calculations, the "gap bin" around the lower boundary of $Bin_0$ results in some count loss even in the case of an ideal ER of 0 keV, with moderate increases in the count loss percentage with increasing ER values.

TABLE 3

| ER (keV) | Bin 5 Spillover | Bin 0 Loss |
| --- | --- | --- |
| 0 | 0% | 2.25% |
| 4 | 0.6% | 2.30% |
| 8 | 3.03% | 2.41% |
| 12 | 7.37% | 2.59% |

Table 4 is a summary of the simulation results shown in Tables 1-3 showing the spillover from $Bin_4$ to $Bin_5$ at various energy resolutions with continuous bins, ±1 keV "gaps" around the boundaries of each bin, and ±2 keV "gaps" around the boundaries of each bin. The column on the right-hand side of Table 4 indicates the percent improvement (meaning the reduction in "spillover" from $Bin_4$ to $Bin_5$) between the conventional detector having continuous energy bins, and a detector having ±2 keV "gaps" around the boundaries of each bin. As shown in Table 4, there is significant improvement (i.e., up to 50% reduction in "spillover" events) at lower ER values, such as 4 keV, which is an achievable ER for energy-discriminating radiation detectors.

TABLE 4

| ER (keV) | Continuous Bins | ±1 keV Gap | ±2 keV Gap | Improvement |
| --- | --- | --- | --- | --- |
| 0 | 0% | 0% | 0% | 0% |
| 4 | 1.2% | 0.85% | 0.6% | 50% |
| 8 | 3.9% | 3.45% | 3.03% | 22% |
| 12 | 8.4% | 7.83% | 7.37% | 12% |

Similar improvements were also demonstrated in the case of reducing count losses from the lowest energy bin (i.e., $Bin_0$) using "gaps" around the boundaries of the energy bins. In practice, the improvements in reducing "spillover" counts between energy bins may be dependent on the width of the "gaps," the energy resolution (ER) of the detector, as well as the shape of the X-ray curve, which may be affected by filtering of the output beam, charge-sharing effects, pile-up effects, and other factors. Further, although the simulations described above evaluated spillover counts from $Bin_4$ to $Bin_5$ and count losses from $Bin_0$, the spillover effects may actually be much more significant, since in a system having multiple energy bins, spillover may occur in both directions between each of the adjacent bins. In addition, the above-described simulations do not account for "threshold drift" effects as described above. Thus, the improvements in reducing spillover by providing gaps between the bins may be even more substantial.

Figure 8:
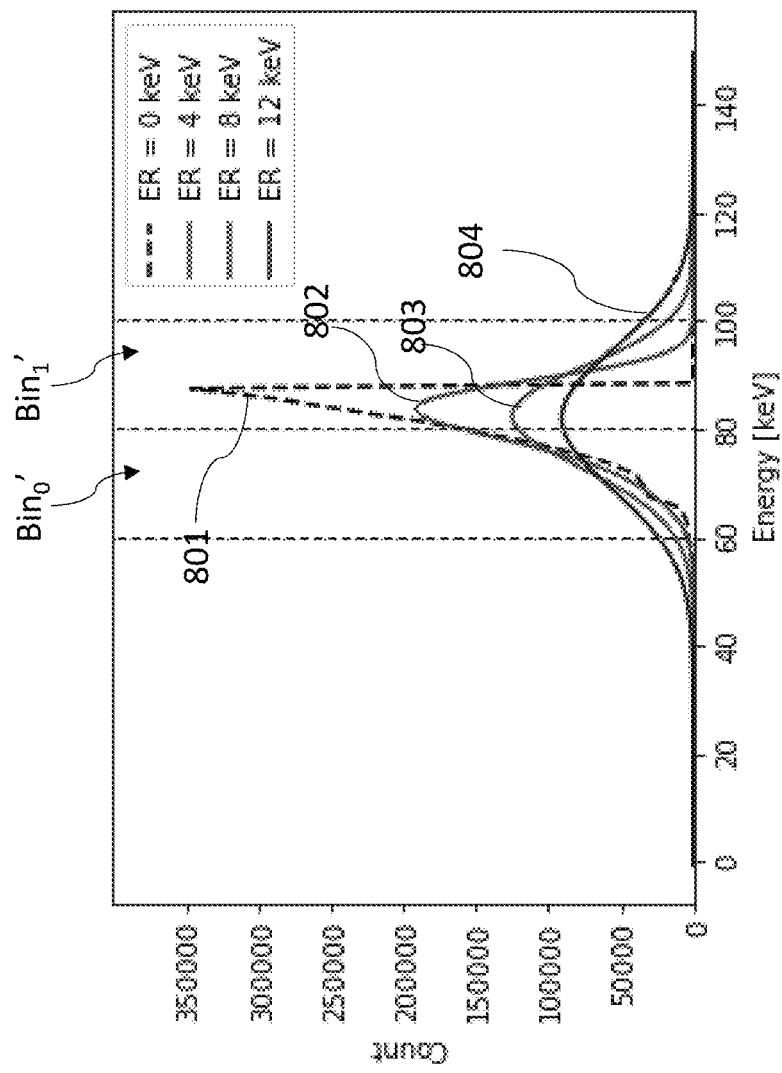
FIG. 8 is a plot illustrating simulated X-ray curves at different energy resolution (ER) values of an energy-discriminating photon-counting X-ray detector in which a gold K-edge filter is provided between the X-ray tube and the detector.

FIG. 8 is a plot illustrating simulated X-ray curves at different energy resolution (ER) values of an energy-discriminating photon-counting X-ray detector in which a gold K-edge filter is provided between the X-ray tube and the detector. The X-ray curves were simulated at 0 keV ER (curve 801), 4 keV ER (curve 802), 8 keV ER (curve 803), and 12 keV ER (curve 804). The presence of the gold K-edge filter is evidenced by the drop in photon counts at energies just above the 80.7 keV K-edge energy of gold. This effect is most clear in the simulation with the ideal ER of 0 keV (curve 801), and becomes less pronounced with increasing ER. The simulations were performed with the assumption a kilovoltage peak (kVpp) of 120 keV.

Simulations of the X-ray curves 801-804 shown in FIG. 8 were performed with the energy bins of the detector reconfigured such that the boundary between a pair of adjacent energy bins corresponded to the 80.7 keV K-edge energy of the gold filter. In particular, the energy bin ($Bin_0'$) on the lower-energy side of the K-edge energy covered a range between 60.7 keV and 80.7 keV, and the energy bin ($Bin_1'$) on the higher-energy side of the K-edge energy covered a range between 80.7 keV and 100.7 keV. A ratio of the counts in $Bin_0'$ to $Bin_1'$ was calculated for each of the four energy resolutions (i.e., 0 keV, 4 keV, 8 keV and 12 keV). The ratio of counts in $Bin_0'$ to $Bin_1'$ represents the detection CNR of the K-edge material (i.e., gold), where the higher the ratio, the better the CNR and material discrimination. As shown in the column labeled "$Bin_0'/Bin_1'$ Continuous Bins" in Table 5, the ratio is highest for the ideal ER of 0 keV, and is significantly worse with increasing ER values.

TABLE 5

| ER (keV) | $Bin_0'/Bin_1'$--Continuous Bins | $Bin_0'/Bin_1'$--±1 keV Gap | ±1 keV Gap Improvement | $Bin_0'/Bin_1'$-±2 keV Gap | ±2 keV Gap Improvement |
|---|---|---|---|---|---|
| 0 | 1194.68 | 1045.599 | −12.48% | 910.546 | −23.78 |
| 4 | 5.0646484 | 6.456154 | 27.93% | 8.47747 | 67.99% |
| 8 | 2.591674 | 2.825508 | 9.02% | 3.090767 | 19.26% |
| 12 | 1.795631 | 1.871495 | 4.22% | 1.951983 | 8.71% |

The same simulations were run using non-continuous energy bins, with ±1 keV "gaps" provided around the K-edge energy between $Bin_0'$ and $Bin_1'$. Photon counts within the "gap" region surrounding the K-edge energy were discarded. The ratio of counts in $Bin_0'$ to $Bin_1'$ was calculated for each of the four energy resolutions (i.e., 0 keV, 4 keV, 8 keV and 12 keV). As shown in the columns labeled "$Bin_0'/Bin_1'$-±1 keV Gap" and "±1 keV Gap Improvement" in Table 5, the addition of ±1 keV gap between the bins caused the count ratio to decrease by 12.48% for the ideal ER of 0 keV. This is due to otherwise accurate counts occurring within the "gap" region being discarded. In the cases of non-zero ER, however, the addition of the "gap" surrounding the K-edge energy caused the $Bin_0'/Bin_1'$ ratio to increase. The largest increase (27.93%) occurred with the ER of 4 keV, with the increases in $Bin_0'/Bin_1'$ ratio becoming smaller with increasing (i.e., worse) ER.

The simulations were again run using non-continuous energy bins, with ±2 keV "gaps" provided around the K-edge energy between $Bin_0'$ and $Bin_1'$. Photon counts within the "gap" region surrounding the K-edge energy were discarded. The ratio of counts in $Bin_0'$ to $Bin_1'$ was calculated for each of the four energy resolutions (i.e., 0 keV, 4 keV, 8 keV and 12 keV). As shown in the columns labeled "$Bin_0'/Bin_1'$—±2 keV Gap" and "±2 keV Gap Improvement" in Table 5, the addition of ±2 keV gap between the bins caused the count ratio to decrease by 23.78% for the ideal ER of 0 keV due to the loss of even more accurate counts occurring within the "gap" region. However, even greater improvements are evident in the simulations with non-zero ER. In particular, for the 4 keV ER simulation, the $Bin_0'/Bin_1'$ count ratio is increased by 67.99% with a ±2 keV gap around the K-edge energy compared to the simulation using continuous energy bins. Less significant but still considerable improvements in the count ratio are present in the cases of 8 keV ER and 12 keV ER.

Accordingly, providing a "gap" region surrounding the K-edge energy of a material of interest between the energy bins on the low-energy and high-energy sides of the K-edge energy may improve the CNR and enhance material discrimination in spectral K-edge imaging applications. Photon counts occurring within the gap region are likely to include a relatively high number of "spillover" counts, and thus these counts may be discarded. The improvements in CNR and material discrimination may be greatest at lower energy resolutions, such as less than 8 keV, including between about 4 keV and 8 keV. In some embodiments, the width of the gap may be between about 2 keV and 4 keV. At larger gap widths, the loss in photon counts becomes more significant and may result in a reduction in CNR.

While the prior embodiments described the gap region between adjacent bins as being located at the K-edge energy, other embodiments are not so limited. Specifically, the gap region may be located between any two adjacent bins, and not just between the bins which straddle the K-edge energy.

The systems and methods in accordance with various embodiments described herein may be used for medical imaging, such as CT imaging with or without a contrast agent, as well as for non-medical imaging applications, such as baggage screening, non-destructive testing (NDT), and other industrial inspection applications.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A method of X-ray imaging, comprising:
   determining energies of photons emitted by an X-ray source and attenuated by an object that are detected by an energy-discriminating radiation detector;
   generating photon count data by counting a number of detected photons in a plurality of energy bins of the energy-discriminating radiation detector that includes a first energy bin and an adjacent second energy bin; and
   generating an X-ray image of the object using the photon count data, wherein detected photons determined to have an energy within a gap region between a maximum energy threshold of the first energy bin and a minimum energy threshold of the second energy bin are not included in the photon count data used to generate the X-ray image of the object.

2. The method of claim 1, wherein the maximum energy threshold of the first energy bin of the energy-discriminating radiation detector is less than a K-edge energy of a material of interest, and the minimum energy threshold of the second energy bin of the energy-discriminating radiation detector is greater than the K-edge energy of the material of interest.

3. The method of claim 2, wherein the maximum energy threshold of the first energy bin and the minimum energy threshold of a second energy bin are equally-spaced from the K-edge energy of the material of interest.

4. The method of claim 2, wherein a gap bin is located between the maximum energy threshold of the first energy bin and the minimum energy threshold of the second energy bin and including the K-edge energy of the material of interest, and wherein detected photons determined to have an energy within the gap bin are not counted in the photon count data.

5. The method of claim 2, wherein multiple gap bins are located between energy bins of the energy-discriminating radiation detector, each gap bin including a K-edge energy of a different material of interest.

6. The method of claim 1, wherein the gap region has a width of 4 keV or less.

7. The method of claim 1, wherein the material of interest comprises one or more of gold, iodine, gadolinium, barium, ytterbium, lanthanum, lutetium, and holmium.

8. The method of claim 1, wherein the object comprises a human or animal patient.

9. The method of claim 8, wherein the material of interest is included in a contrast medium that is administered to the human or animal patient prior to or during an X-ray imaging scan.

10. The method of claim 9, wherein the X-ray imaging scan comprises a computed tomography (CT) imaging scan.

11. The method of claim 1, wherein generating the X-ray image using the photon count data comprises identifying the material of interest in X-ray attenuation data detected by the energy-discriminating radiation detector based on a difference in photon count data between the first energy bin and the second energy bin.

12. An X-ray imaging system, comprising:
an X-ray source configured to direct a beam of X-ray radiation at an object;
an energy-discriminating radiation detector comprising a plurality of radiation sensors configured to detect X-rays from the X-ray source that have been attenuated by the object; and
detector read-out circuitry configured to determine an energy of X-ray photons detected by the plurality of radiation sensors and to generate photon count data by counting a number of detected photons in a plurality of energy bins, the plurality of energy bins comprising a first energy bin having a maximum energy threshold that is less than a K-edge energy of a material of interest, and a second energy bin having a minimum energy threshold that is greater than the K-edge energy of the material of interest; and
a processor configured to generate an X-ray image of the object using the photon count data, wherein photons detected by the plurality of radiation sensors that are determined to have an energy within a gap region between the maximum energy threshold of the first energy bin and the minimum energy threshold of the second energy bin are not included in the photon count data used to generate the X-ray image of the object.

13. The X-ray imaging system of claim 12, wherein the gap region has a width of 4 keV of less.

14. The X-ray imaging system of claim 13, wherein the gap region has a width of 2 keV or less.

15. The X-ray imaging system of claim 12, wherein the X-ray imaging system comprises a computed tomography (CT) X-ray imaging system.

16. The X-ray imaging system of claim 15, further comprising a contrast injection apparatus configured to provide a controlled volume of a contrast medium including the material of interest into the object in coordination with an X-ray scan of the object.

17. The X-ray imaging system of claim 12, further comprising a K-edge filter disposed in a beam path between the X-ray source and the object, the K-edge filter comprising the material of interest.

18. The X-ray imaging system of claim 12, wherein the X-ray imaging system comprises a baggage screening system.

19. The X-ray imaging system of claim 12, wherein the X-ray imaging system comprises a non-destructive testing system.

20. The X-ray imaging system of claim 12, wherein the material of interest comprises one or more of gold, iodine, gadolinium, barium, ytterbium, lanthanum, lutetium, and holmium.

* * * * *